(12) United States Patent
Rowe

(10) Patent No.: US 8,739,859 B2
(45) Date of Patent: Jun. 3, 2014

(54) REVERSIBLE THERMAL RECTIFIERS, TEMPERATURE CONTROL SYSTEMS AND VEHICLES INCORPORATING THE SAME

(75) Inventor: Michael Paul Rowe, Pinckney, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 708 days.

(21) Appl. No.: 12/897,280

(22) Filed: Oct. 4, 2010

(65) Prior Publication Data

US 2012/0079833 A1 Apr. 5, 2012

(51) Int. Cl.
*F28F 27/00* (2006.01)
*F28F 5/00* (2006.01)

(52) U.S. Cl.
USPC ........... 165/276; 165/275; 165/96; 165/904; 165/86; 165/41; 165/42; 165/43

(58) Field of Classification Search
USPC ............ 165/275, 276, 277, 41–43; 236/1 C
See application file for complete search history.

(56) References Cited

U.S. PATENT DOCUMENTS

| | | | | |
|---|---|---|---|---|
| 4,064,932 | A * | 12/1977 | Iriarte | 165/86 |
| 5,917,195 | A | 6/1999 | Brown | |
| 7,416,019 | B2 | 8/2008 | Osiander et al. | |
| 2003/0066299 | A1* | 4/2003 | Aoki | 62/186 |
| 2004/0195675 | A1* | 10/2004 | Rossetti | 257/712 |
| 2007/0230135 | A1 | 10/2007 | Feger et al. | |
| 2008/0277162 | A1* | 11/2008 | DiFoggio | 175/17 |
| 2009/0277609 | A1* | 11/2009 | Chang et al. | 165/96 |
| 2010/0044644 | A1 | 2/2010 | Mantese | |
| 2010/0155043 | A1 | 6/2010 | Smith | |
| 2010/0167004 | A1* | 7/2010 | Chang et al. | 428/109 |
| 2012/0017564 | A1* | 1/2012 | Dhingra et al. | 60/39.093 |

FOREIGN PATENT DOCUMENTS

JP 56-085694 * 11/1981

OTHER PUBLICATIONS

John Miller, Proceedings of the ASME 2009 Heat Transfer Summer Conference, Jul. 19-23, 2009, "Thermal Rectification by Ballistic Phonons in Asymmetric Nanostructures", pp. 1-10.

* cited by examiner

*Primary Examiner* — John Ford
*Assistant Examiner* — Dawit Muluneh
(74) *Attorney, Agent, or Firm* — Dinsmore & Shohl LLP

(57) ABSTRACT

Reversible thermal rectifiers for selectively controlling the direction of heat flow include a plurality of asymmetrically shaped objects disposed in a fluid medium, wherein each of the plurality of asymmetrically shaped objects include a refractive side and a reflective side such that heat flows past the plurality of asymmetrically shaped objects when approaching from the refractive side, and heat is reflected from the plurality of asymmetrically shaped objects when approaching from the reflective side, and a bidirectional field actuator system that selectively orients the plurality of asymmetrically shaped objects between a first orientation, wherein the reflective sides of the plurality of asymmetrically shaped objects face a first direction, and a second orientation, wherein the reflective sides of the plurality of asymmetrically shaped objects face a second direction, substantially opposite the first direction.

30 Claims, 6 Drawing Sheets ial properties which are not available naturally, such as directional or orientation dependent heat flow. Such metamaterials may allow for heat to flow past it in one direction, while reflecting heat back as it approaches in the opposite direction. Metamaterials may thereby be used to produce a heat flow gradient where heat primarily flows in only one direction. However, such metamaterials remain static in their orientation leading to a static direction of heat flow. Thus, the entire apparatus containing the metamaterials would need to be reconfigured in order to stop or change the direction of heat flow.

REVERSIBLE THERMAL RECTIFIERS, TEMPERATURE CONTROL SYSTEMS AND VEHICLES INCORPORATING THE SAME

TECHNICAL FIELD

The present specification generally relates to temperature control systems and, more specifically, reversible thermal rectifiers for selectively controlling the direction of heat flow.

BACKGROUND

Metamaterials are man-made materials with material properties that are engineered to achieve a desired effect. For example, metamaterials can be engineered to possess mate- Accordingly, a need exists for alternative reversible thermal rectifiers for selectively orienting objects to influence the direction of heat flow.

SUMMARY

In one embodiment, a reversible thermal rectifier for selectively controlling the direction of heat flow is disclosed. The reversible thermal rectifier may include a plurality of asymmetrically shaped objects disposed in a fluid medium, wherein each of the plurality of asymmetrically shaped objects include a refractive side and a reflective side such that heat flows past the plurality of asymmetrically shaped objects when approaching from the refractive side, and heat is reflected from the plurality of asymmetrically shaped objects when approaching from the reflective side. The reversible thermal rectifier may further include a bidirectional field actuator system that selectively orients the plurality of asymmetrically shaped objects between a first orientation, wherein the reflective sides of the plurality of asymmetrically shaped objects face a first direction, and a second orientation, wherein the reflective sides of the plurality of asymmetrically shaped objects face a second direction, substantially opposite the first direction.

In another embodiment, a temperature control system may include a reversible thermal rectifier and a temperature monitoring and heat flow control system. The reversible thermal rectifier may include a plurality of asymmetrically shaped objects disposed in a fluid medium, wherein each of the plurality of asymmetrically shaped objects include a refractive side and a reflective side such that heat flows past the plurality of asymmetrically shaped objects when approaching from the refractive side, and heat is reflected from the plurality of asymmetrically shaped objects when approaching from the reflective side. The reversible thermal rectifier may further include a bidirectional field actuator system that selectively orients the plurality of asymmetrically shaped objects between a first orientation, wherein the reflective sides of the plurality of asymmetrically shaped objects face a first direction, and a second orientation, wherein the reflective sides of the plurality of asymmetrically shaped objects face a second direction, substantially opposite the first direction. The temperature monitoring system may be communicatively coupled to the reversible thermal rectifier and include an exterior temperature sensor that measures an exterior temperature, the exterior temperature sensor communicatively coupled to a controller, and an interior temperature sensor that measures an interior temperature, the interior temperature sensor communicatively coupled to the controller. The controller may control the orientation of the plurality of asymmetrically shaped objects based on the exterior temperature, the interior temperature or both the exterior temperature and the interior temperature.

In yet another embodiment, a vehicle with a temperature control system may include a reversible thermal rectifier and a temperature monitoring and heat flow control system. The reversible thermal rectifier may be disposed between an interior of the vehicle and an exterior surface of the vehicle and include a plurality of asymmetrically shaped objects disposed in a fluid medium, each of the plurality of asymmetrically shaped objects including a refractive side and a reflective side, wherein heat flows past the plurality of asymmetrically shaped objects when approaching from the refractive side, and heat is reflected from the plurality of asymmetrically shaped objects when approaching from the reflective side. The reversible thermal rectifier may further include a bidirectional field actuator system that selectively orients the plurality of asymmetrically shaped objects between a first orientation, wherein the reflective sides of the plurality of asymmetrically shaped objects face a first direction, and a second orientation, wherein the reflective sides of the plurality of asymmetrically shaped objects face a second direction, substantially opposite the first direction. The temperature monitoring system may include an exterior temperature sensor to measure an exterior temperature, the exterior temperature sensor communicatively coupled to a controller, and an interior temperature sensor to measure an interior temperature, the interior temperature sensor communicatively coupled to the controller. The controller may control the orientation of the plurality of asymmetrically shaped objects based on the exterior temperature, the interior temperature or both the exterior temperature and the interior temperature.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
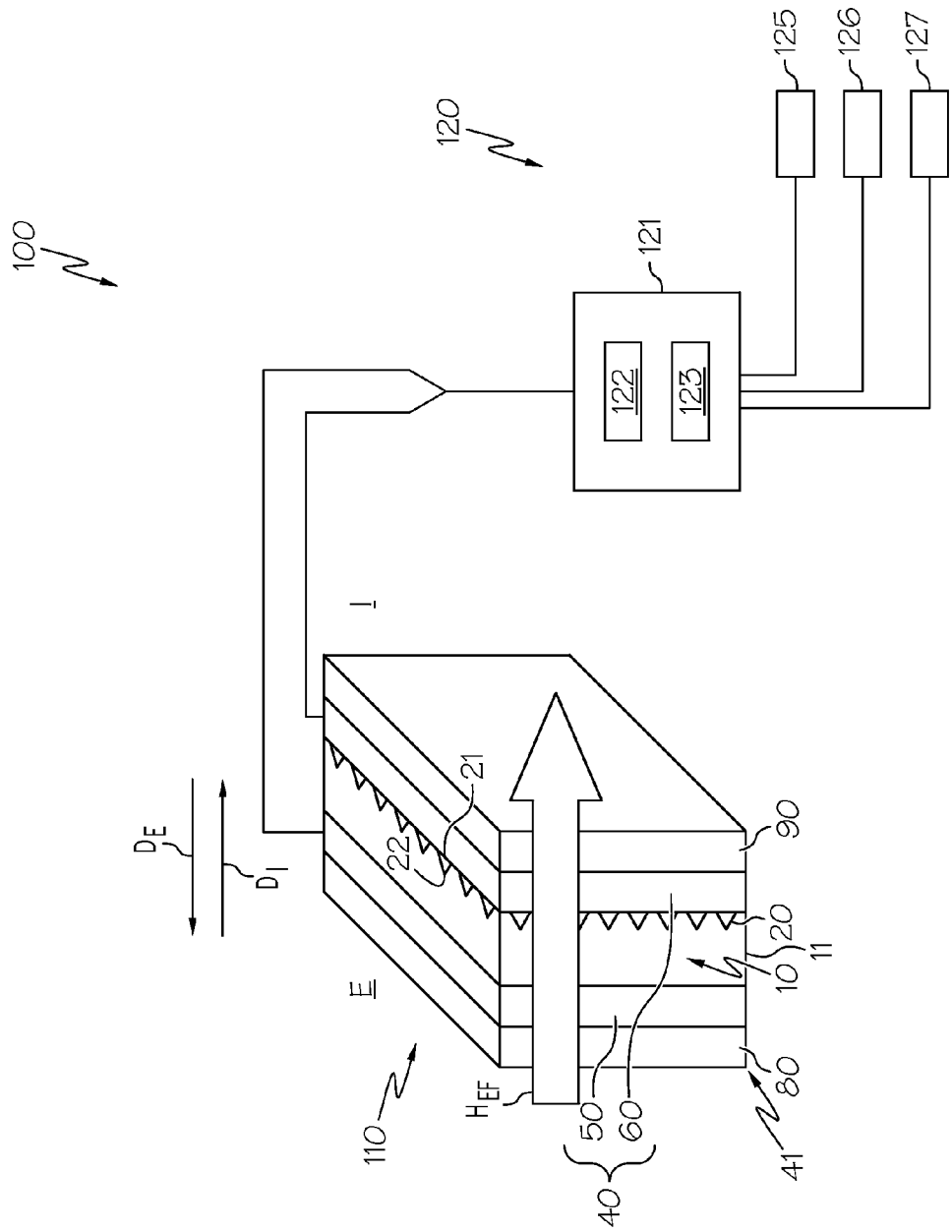
FIG. 1A schematically depicts a temperature control system with the plurality of asymmetrically shaped objects oriented in a first orientation and heat approaching from an exterior side according to one or more embodiments shown and described herein.

FIG. 1A generally depicts one embodiment of a temperature control system. The temperature control system can generally include a reversible thermal rectifier communicatively coupled with a temperature monitoring and heat flow control system. Based on temperature feedback or other conditions monitored by the temperature monitoring and heat flow control system, the reversible thermal rectifier can selectively orient a plurality of asymmetrically shaped objects between a first orientation and a second orientation to influence the direction of heat flow across the reversible thermal rectifier. Various embodiments of temperature control systems for selectively influencing the direction of heat flow will be described in more detail herein Referring now to FIGS. 1-2, a temperature control system 100 schematically illustrated comprises a reversible thermal rectifier 110 and a temperature monitoring and control system 120. The reversible thermal rectifier 110 generally comprises a bidirectional field actuator system 40 disposed adjacent to or surrounding a fluid medium 10 containing a plurality of asymmetrically shaped objects 20.

Figure 1B:
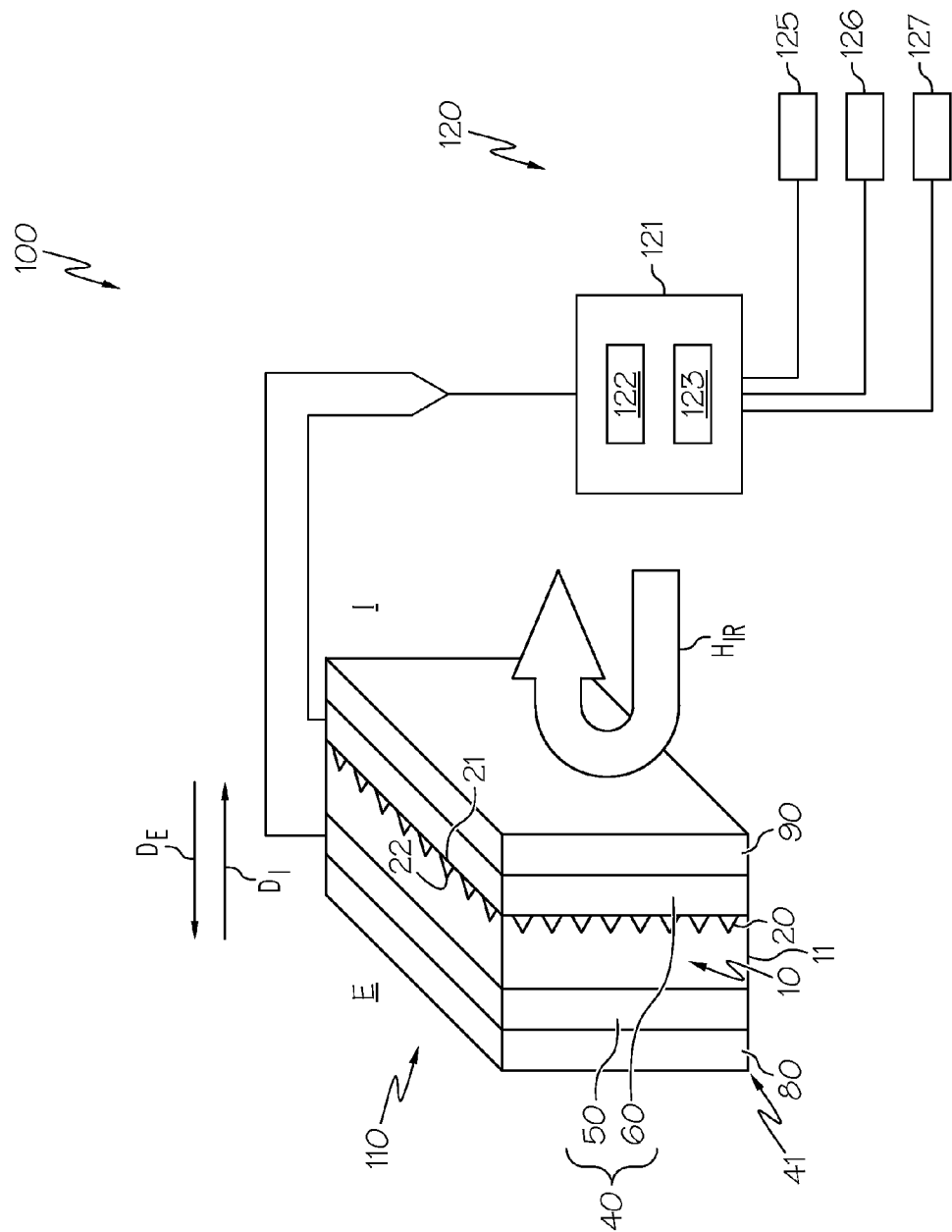
FIG. 1B schematically depicts a temperature control system with the plurality of asymmetrically shaped objects oriented in a first orientation and heat approaching from an interior side according to one or more embodiments shown and described herein.
Figure 2A:
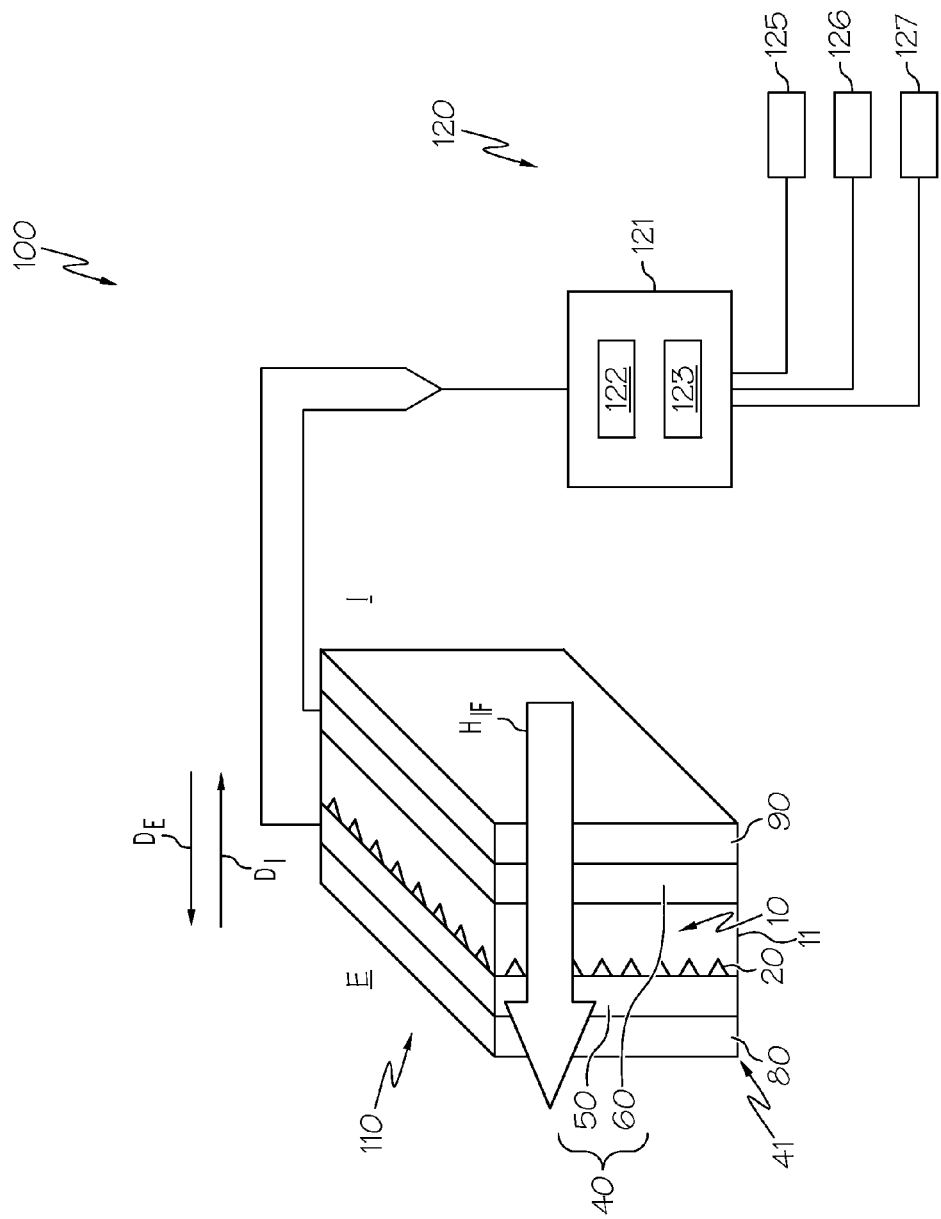
FIG. 2A schematically depicts a temperature control system with the plurality of asymmetrically shaped objects oriented in a second orientation and heat approaching from an interior side according to one or more embodiments shown and described herein.
Figure 2B:
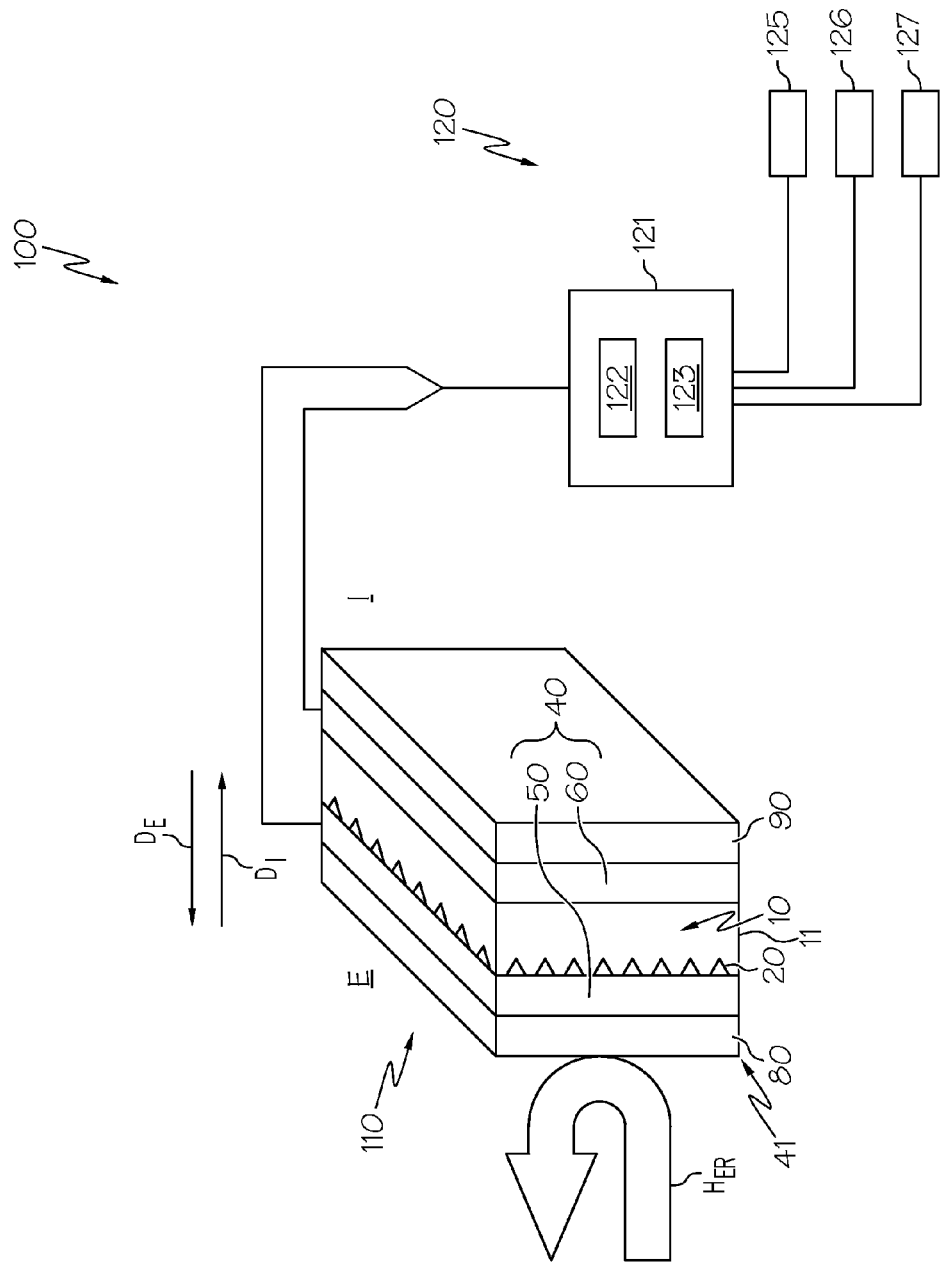
FIG. 2B schematically depicts a temperature control system with the plurality of asymmetrically shaped objects oriented in a second orientation and heat approaching from an exterior side according to one or more embodiments shown and described herein.

Referring now to FIGS. 1-4, the plurality of asymmetrically shaped objects 20 can comprise any object with an asymmetrical geometry having a refractive side 22 and a reflective side 21, wherein heat substantially flows past the asymmetrically shaped object 20 when approaching from the refractive side 22 (as illustrated in FIGS. 1A and 2A) and heat is substantially reflected from the asymmetrically shaped object 20 when approaching from the reflective side 21 (as illustrated in FIGS. 1B and 2B). As used herein, heat flow refers to the trajectory of thermal phonons through a material.

Figure 4:
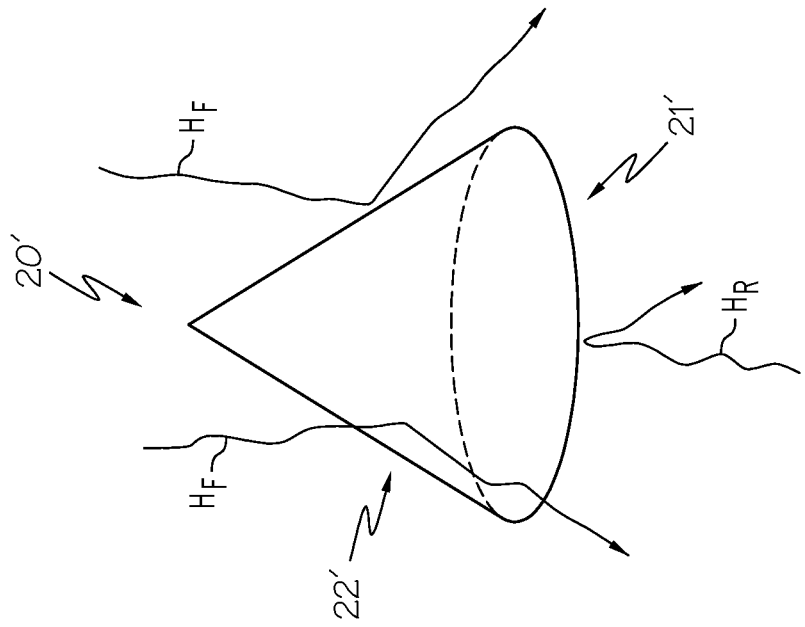
FIG. 4 schematically depicts another asymmetrically shaped object according to one or more embodiments shown and described herein.
Figure 3:
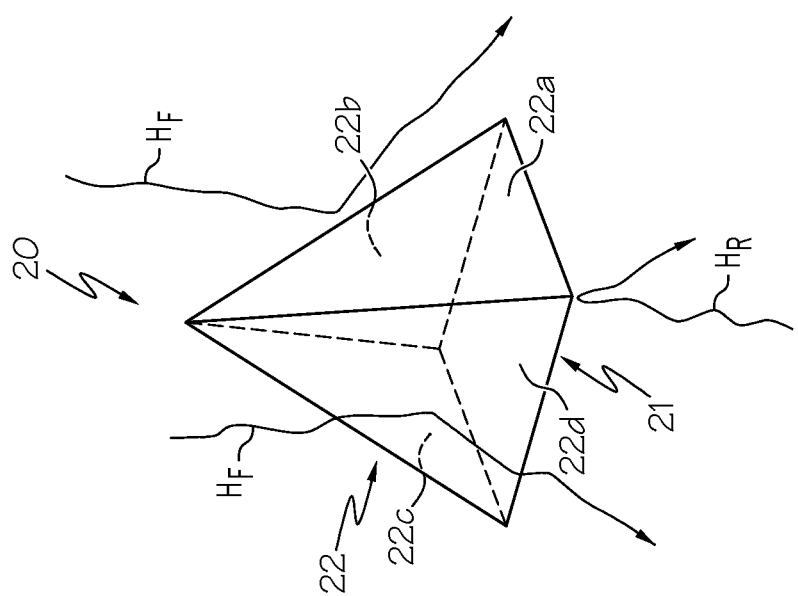
FIG. 3 schematically depicts an asymmetrically shaped object according to one or more embodiments shown and described herein.

For example, as best illustrated in FIGS. 3 and 4, the plurality of asymmetrically shaped objects 20 can comprise a variety of different configurations that refract heat approaching from the refractive side 22, allowing for heat flow $H_F$ through the plurality of asymmetrically shaped objects 20, and reflect heat approaching from the reflective side 21, allowing for heat reflection $H_R$ from the plurality of asymmetrically shaped objects 20. In one exemplary embodiment illustrated in FIG. 3, an asymmetrically shaped object 20 can have a pyramid-shape with a substantially flat reflective side 21 and three or more sloped walls 22a, 22b, 22c and 22d comprising the refractive side 22. In another exemplary embodiment illustrated in FIG. 4, an alternative asymmetrically shaped object 20' can comprise a cone-shape comprising a substantially flat reflective side 21' and cone-shaped refractive side 22'. While specific configurations are illustrated in FIGS. 3 and 4, it should be appreciated that alternative configurations may additionally or alternatively be utilized such that a reflective side substantially reflects heat and a refractive side refracts heat. The plurality of asymmetrically shaped objects 20 may also comprise any size and dimension that allows them to be disposed in the fluid medium 10. For example, in one embodiment, the plurality of asymmetrically shaped objects 20 are only a few microns or even nanometers in their dimensions to allow for numerous objects to be disposed in a relatively small area. Furthermore, the plurality of asymmetrically shaped objects 20 can comprise a single type of asymmetrically shaped object, or may comprise a variety of different asymmetrically shaped objects comprising different sizes and/or configurations.

Referring to FIGS. 3-4, heat can then approach the asymmetrically shaped object 20 from different directions. When heat approaches from the refractive side 22 of the asymmetrically shaped object 20, the geometrical configuration of the object allows for heat flow $H_F$ past the object such that the thermal phonons experience only some deflection while glancing off of the asymmetrically shaped object 20. With such a heat flow $H_F$, heat will generally flow past the plurality of asymmetrically shaped objects 20 such that, when the temperature on the refractive side 22 is higher than the temperature on the reflective side 22, a heat gradient exists allowing the excess heat to flow from the refractive side past the asymmetrically shaped object 20 to balance the two temperatures.

However, when heat approaches from the reflective side 21 of the asymmetrically shaped object 20, the geometrical configuration of the objects allows for heat reflection $H_R$ such that the thermal phonons are substantially reflected. In such heat reflection $H_R$, heat on the reflective side 21 of the asymmetrically shaped object will generally remain on the reflective side 21 and not flow past the asymmetrically shaped object 20. Thus, when the temperature is higher on the reflective side 21 than the refractive side 22, the respective temperatures will remain relatively constant without influencing one another. By selectively orienting the plurality of asymmetrically shaped objects 20 with respect to a temperature gradient (i.e., the temperature on the refractive side 22 of the asymmetrically shaped object 20 and the temperature on the reflective side 21 of the asymmetrically shaped object 20), heat flow may be selectively controlled.

The plurality of asymmetrically shaped objects 20 may comprise any material or materials that can combine to influence the directional flow, such as by redirecting the flow of thermal phonons (e.g., reflecting or refracting), and also allow for reorientation via the bidirectional field actuator system 40, as will be described further herein. For example, in one embodiment, the plurality of asymmetrical shaped objects 20 may comprise a material that reacts with the bidirectional field actuator system 40. In one exemplary embodiment, where the bidirectional field actuator system 40 comprises an electromagnet or the like, the plurality of asymmetrically shaped objects 20 can comprise a material that reacts to the magnetic field produced by the electromagnet. Specifically, the direction of the magnetic field can interact with the plurality of asymmetrically shaped objects 20 to influence their orientation. For example, in one such embodiment, the plurality of asymmetrically shaped objects 20 can comprise iron. In another embodiment, the plurality of asymmetrically shaped objects 20 can comprise any other material response to an applied magnetic field.

In one particular embodiment, the plurality of asymmetrically shaped objects 20 may comprise a core material and a surface material. In such an embodiment, the core material can provide the overall shape and structure to the object thereby providing its asymmetrical configuration. Exemplary core materials include polymeric materials, such as polystyrene, or semi-conductive materials. The core material may further provide the ability to influence the direction of heat flow as discussed above. The surface material may comprise a material that is responsive to the bidirectional field actuator system 40 such that the plurality of asymmetrically shaped objects 20 may be oriented based on the field or other mechanism provided by the bidirectional field actuator system 40. In one such embodiment, the surface material is uniformly coated over the entire surface of the plurality of asymmetrically shaped objects 20. In another embodiment, the surface material may non-uniformly coat the asymmetrically shaped objects 20 such as when the reflective side 21 and the refractive side 22 comprise different amounts of surface material (e.g., a thicker coating on one side). In yet another embodiment, the surface material may only coat a portion of the asymmetrically shaped objects 20. For example, only the reflective side 21 or only the refractive side 22 may comprise the surface coating. Such embodiments comprising selective positioning or amounts of the surface coating may further assist in the reorientation of the plurality of asymmetrically shaped objects 20 by the bidirectional field actuator system 40.

Referring now to FIGS. 1-2, the plurality of asymmetrically shaped objects 20 can be disposed in a fluid medium 10. The fluid medium 10 can comprise any material that allows for the distribution of the plurality of asymmetrically shaped objects 20 while further allowing for the reorientation (e.g. rotation) of the plurality of asymmetrically shaped objects 20. For example, in one embodiment, the fluid medium 10 can comprise water. In another embodiment, the fluid medium 10 can comprise a hydrocarbon-based fluid such as hydraulic oil or the like. The fluid medium 10 can comprise any other liquid that comprises a viscosity operable to disperse the plurality of asymmetrically shaped objects 20 and allow for the reorientation (e.g., rotation) of the plurality of asymmetrically shaped objects 20 via the bidirectional field actuator system 40. In addition, the fluid medium 10 may comprise additives such as, for example, antifreeze, coolant, dispersants or any other non-corrosive and/or non-volatile fluids to enhance the performance of the temperature control system. The fluid medium 10 may be contained in a chamber 11 disposed between or within the bidirectional field actuator system 40 such as, for example, having a rectangular (as illustrated in FIGS. 1-2), square, circular, or other geometrical or non-geometrical profile.

Furthermore, the plurality of asymmetrically shaped objects 20 may be dispersed within the fluid medium 10 in various configurations. For example, in one embodiment, as illustrated in FIGS. 1-2, the plurality of asymmetrically shaped objects 20 may comprise a single plane of asymmetrically shaped objects 20. In another embodiment, the reversible thermal rectifier 110 may comprise a plurality of planes of asymmetrically shaped objects 20. For example, the fluid medium 10 may be disposed in a plurality of chambers 11, wherein each chamber comprises a plane of asymmetrically shaped objects 20 dispersed in the fluid medium 10.

Still referring to FIGS. 1-2, the bidirectional field actuator system 40 can be disposed adjacent or surrounding the fluid medium 10 and comprise any actuating system capable of selectively orienting the plurality of asymmetrically shaped objects 20 disposed in the fluid medium 10. In one embodiment, the bidirectional field actuator system may comprise a first field actuator 50 disposed on one side of the fluid medium 10 (such as on the exterior side E as illustrated in FIGS. 1-2) and a second field actuator 60 disposed on the opposite side of the fluid medium 10 (such as on the interior side I as illustrated in FIGS. 1-2). In such an embodiment, the first field actuator 50 and the second field actuator 60 are selectively activated to control the direction of a field applied across the fluid medium 10. The resulting field interacts with the plurality of asymmetrically shaped objects 20 to selectively orient the plurality of asymmetrically shaped objects 20 between a first orientation, wherein the reflective sides 22 of the asymmetrically shaped objects face a first direction (e.g., the exterior side E), and a second orientation, wherein the reflective sides 22 of the asymmetrically shaped objects 20 face a second direction, opposite the first direction (e.g., the interior side I). In one embodiment, the first field actuator 50 and the second field actuator 60 comprise electromagnets that produce a magnetic field. In another embodiment, the bidirectional field actuator system 40 produces an electrostatic field to selectively orient the plurality of asymmetrically shaped objects 20. However, it should be understood that the bidirectional field actuator system 40 may comprise any other system operable to actuate a field to selectively orient the plurality of asymmetrical objects 20.

The reversible thermal rectifier 110 can thereby selectively control the direction of heat flow between an interior direction $D_I$ and an exterior direction $D_E$. Specifically, referring to FIGS. 1A and 1B, it may be desirable for heat to travel from an exterior side E to an interior side I in the interior direction $D_I$ or similarly remain on the interior side I of the reversible thermal rectifier 110. In such embodiments, the bidirectional field actuator system 40 can include a first field actuator 50 and a second field actuator 60 disposed on opposite sides of the fluid medium 10 in which the plurality of asymmetrically shaped objects 20 are disposed. To maintain and/or increase heat on the interior side I, the bidirectional field actuator system 40 utilizes the first field actuator 50 and the second field actuator 60 to orient the plurality of asymmetrically shaped objects 20 such that the reflective side 21 of the plurality of asymmetrically shaped objects 20 faces the interior side I and the refractive side 22 of the plurality of asymmetrically shaped objects 20 faces the exterior side E. Thus, as illustrated in FIG. 1A, heat $H_{EF}$ will generally flow from the exterior side E to the interior side I as the thermal phonons only interact with the refractive side 22 of the plurality of asymmetrically shaped objects 20. Conversely, as illustrated in FIG. 1B, heat will generally reflect $H_{IR}$ off of the interior side I of the reversible thermal rectifier 110 such that the heat already on the interior side I will remain on the interior side I without traveling through the reversible thermal rectifier 110 in the exterior direction $D_E$.

Referring now to FIGS. 2A and 2B, it may be desirable for heat to travel from the interior side I to the exterior side E in the exterior direction $D_E$ or similarly remain on the exterior side E of the reversible thermal rectifier 110. As discussed above, in such embodiments, the bidirectional field actuator system 40 can include the first field actuator 50 and the second field actuator 60 disposed on opposite sides of the fluid medium 10 in which the plurality of asymmetrically shaped objects 20 are disposed. To maintain and/or increase heat on the exterior side E, the bidirectional field actuator system 40 utilizes the first field actuator 50 and the second field actuator 60 to orient the plurality of asymmetrically shaped objects 20 such that the reflective side 21 of the plurality of asymmetrically shaped objects 20 face the exterior side E and the refractive side 22 of the plurality of asymmetrically shaped objects 20 faces the interior side I. Thus, as illustrated in FIG. 2A, heat $H_{IF}$ flows from the interior side I to the exterior side E as the thermal phonons only interacting with the refractive side 22 of the plurality of asymmetrically shaped objects 20. Conversely, as illustrated in FIG. 2B, heat $H_{ER}$ will generally reflect from the exterior side E of the reversible thermal rectifier 110 such that the heat already on the exterior side E will remain on the exterior side E without traveling through the reversible thermal rectifier 110 in the interior direction $D_I$.

While reference has been made to the reversible thermal rectifier 110 in FIGS. 1A, 1B, 2A and 2B having an exterior side E and an interior side I, it should be appreciated that the "exterior" and "interior" are used for reference purposes only and are not meant to limit the potential application of reversible thermal rectifiers 110. For example, in one embodiment, the reversible thermal rectifier may be disposed along an outdoor structure with open areas on both sides so that it could have two "exterior" sides (as opposed to only one "exterior" side).

In one embodiment, the reversible thermal rectifier may be disposed within any type of housing 41. For example, as illustrated in FIGS. 1-2, the bidirectional field actuator system 40 may be surrounded by a first substrate 80 and a second substrate 90, or otherwise defined within a housing 41. The first substrate 80 and the second substrate 90 may comprise, for example, exterior and interior walls of a vehicle, exterior and interior walls of a building, or any other similar type of structure.

In addition, with reference to FIGS. 1-2, the reversible thermal rectifier 110 may be utilized in a temperature control system 100. The temperature control system 100 may comprise the reversible thermal rectifier 110 in addition to a temperature monitoring and heat flow control system 120. The temperature monitoring and heat flow control system 120 may be utilized to monitor the temperature on one or both sides of the reversible thermal rectifier 110 and/or control the orientation of the plurality of asymmetrically shaped objects 20 via the bidirectional field actuator system 40.

More specifically, the bidirectional field actuator system 40 of the reversible thermal rectifier 110 can be communicatively coupled to a controller 121 of the temperature monitoring and heat flow control system 120. As used herein, "communicatively coupled" means the controller 121 is operable to send actuating signals to the bidirectional field actuator system 40 to control the direction of the applied field. In one embodiment, the controller can comprise a processor 122 and memory 123 with readable and executable instructions. In such an embodiment, the processor 122 can execute the readable and executable instructions to, for example, receive and/or process one or more temperature readings and/or condition events and activate a field from the bidirectional field actuator system 40 based on the temperature readings and/or condition events. For example, the temperature monitoring and heat flow control system 120 can comprise a plurality of temperature sensors 125, 126, 127. The plurality of temperature sensors 125, 126, 127 can be disposed at various locations relative to the reversible thermal rectifier 110. The plurality of temperature sensors 125, 126 127 assist in determining the orientation of the plurality of asymmetrically shaped objects 20.

For example, a first temperature sensor 125 may be positioned on the exterior side E (or first side) of the reversible thermal rectifier 110. A second temperature sensor 126 may be positioned on the interior side I (or the second side, opposite the first side) of the reversible thermal rectifier 110. In such an embodiment, the controller 121 compares the temperature readings of the first temperature sensor 125 and the second temperature sensor 126 to determine the orientation of the plurality of asymmetrically shaped objects 20 in the reversible thermal rectifier 110. For example, in one embodiment, the controller 121 is programmed to orient the plurality of asymmetrically shaped objects 20 such that the reflective sides 21 face the side of the reversible thermal rectifier 110 that has the highest temperature reading. Such orientation would thereby limit the amount of heat transferred from the warmer side to the cooler side. Alternatively, the controller 121 is programmed to orient the plurality of asymmetrically shaped objects 20 such that the refractive sides 22 face the side of the reversible thermal rectifier 110 that has the highest temperature reading. Such orientation would thereby allow heat to transfer from the warmer side to the cooler side.

In one embodiment, the temperature monitoring and heat flow control system 120 may comprise a single temperature sensor 125 placed on one side of the reversible thermal rectifier 110. In such an embodiment, the controller 121 may orient the plurality of asymmetrically shaped objects 20 based on the specific reading of the single temperature sensor 125. For example, if the single temperature sensor 125 reads below a threshold temperature limit then the controller 121 may decide to orient the reflective side 21 towards that side of the reversible thermal rectifier 110 to encourage heat to flow to that side and remain on that side. Conversely, if the single temperature sensor 125 reads above a threshold limit then the controller 121 is programmed to orient the reflective side 21 towards that side of the reversible thermal rectifier 110 to encourage heat to flow away and remain away from that side.

Figure 5:
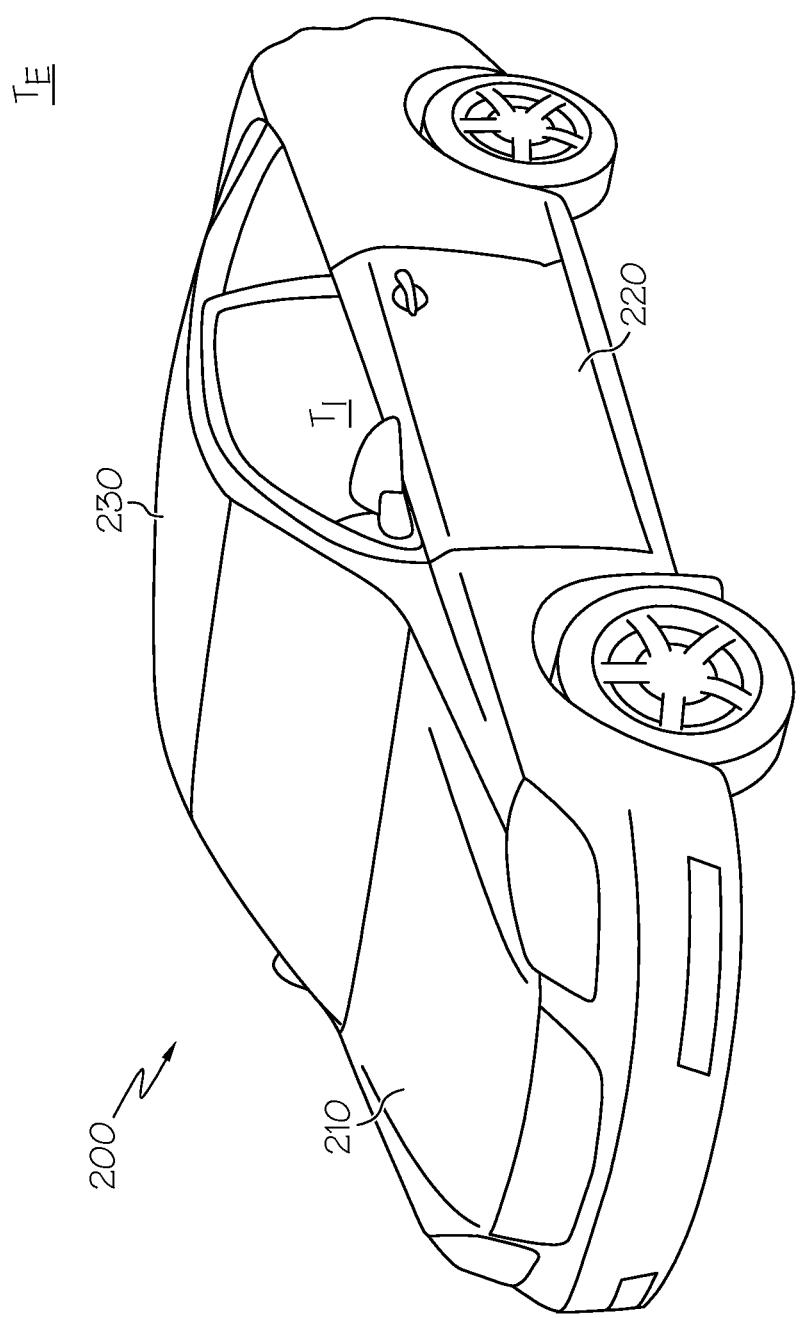
FIG. 5 schematically depicts a vehicle according to one or more embodiments shown and described herein.

For example, the temperature control system 100 may be implemented in a variety of settings to selectively control heat flow between two areas. For example, referring now to FIGS. 1-2 and 5, the temperature control system 100 may be incorporated into one or more locations in a vehicle 200 such as an interior $T_I$ of the vehicle and an exterior surface of the vehicle 210, 220, 230. The temperature control system 100 may thereby be used to control the interior temperature $T_I$ of the vehicle 200 with respect to the exterior temperature $T_E$ of the vehicle 200. For instance, in one embodiment, the temperature control system 100 may be incorporated in the roof section 230 of the vehicle 200 (e.g., disposed between a roof of the vehicle 200 and a passenger compartment of the temperature controlled vehicle 200) and/or side section 220 of the vehicle 200 (e.g., disposed between an outer door wall of the vehicle 200 and a passenger compartment of the temperature controlled vehicle 200). In such an embodiment, the temperature monitoring and heat flow control system 120 of the temperature control system 100 may dictate the orientation of the plurality of asymmetrically shaped objects 20 based on a variety of factors. For example, the temperature monitoring and heat flow control system 120 may orient the plurality of asymmetrically shaped objects 20 based on whether the interior temperature $T_I$ is above or below a threshold, whether the interior temperature $T_I$ is above or below the exterior temperature $T_E$, or whether the exterior temperature $T_E$ is above or below a threshold.

In another embodiment, the temperature monitoring and heat flow control system 120 may comprise three temperature sensors 125, 126, 127. For example, the first temperature sensor 125 may be placed on the exterior of the vehicle 200. The second temperature sensor 126 may be placed on the interior of the vehicle 200. The third temperature sensor 127 may be placed adjacent the engine of the vehicle 200 (e.g., between a hood of the vehicle 200 and an engine compartment of the vehicle 200). Thus, in determining the orientation of the plurality of asymmetrically shaped objects 20, the controller 121 may use a combination of the relationship between the exterior temperature $T_E$ and the interior temperature $T_I$ as well as the temperature of the engine. This may allow for the controller 121 to analyze a plurality of factors (e.g., passenger convenience, vehicle performance, overall safety) when controlling heat flow.

Additionally, or alternatively, the temperature monitoring and heat flow control system 120 may dictate the orientation of the plurality of asymmetrically shaped objects 20 based on other events or factors. For example, where the temperature control system 100 is disposed in a hood section 210 of the vehicle 200, the temperature monitoring and heat flow control system 120 may orient the reflective side 21 of the plurality of asymmetrically shaped objects 20 facing the exterior of the vehicle 200. Such an orientation may assist the engine in not overheating. In another embodiment, the temperature monitoring and heat flow control system 120 may orient the reflective side 21 of the plurality of asymmetrically shaped objects 20 facing the exterior of the vehicle 200 when the air conditioning is activated. Conversely, the temperature monitoring and heat flow control system 120 may orient the reflective side 21 of the plurality of asymmetrically shaped objects 20 facing the interior of the vehicle 200 when the interior heat is activated. Such embodiments may assist in efficiently controlling the interior temperature $T_I$ of the vehicle 200 based on the operating conditions.

It should now be appreciated that reversible thermal rectifiers may be utilized in a variety of applications to assist in controlling the relative temperatures on both sides of an object. Temperature control systems can incorporate reversible thermal rectifiers and temperature monitoring and heat flow control systems to selectively orient asymmetrically shaped objects to either reflect the flow of heat (such that it does not pass through to the other side) or only refract the flow of heat (such that it does pass through to the other side). Multiple temperature sensors and condition indicators can thereby dictate the orientation of the plurality of asymmetrically shaped objects as an additional control method of managing temperature conditions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A reversible thermal rectifier for selectively controlling a direction of heat flow, the reversible thermal rectifier comprising:
    a plurality of asymmetrically shaped objects distributed in a fluid medium, each of the plurality of asymmetrically shaped objects comprising a refractive side and a reflective side, wherein heat flows past the plurality of asymmetrically shaped objects when approaching from the refractive side, and heat is reflected from the plurality of asymmetrically shaped objects when approaching from the reflective side; and
    a bidirectional field actuator system that applies a field to the plurality of asymmetrically shaped objects to selectively orient the plurality of asymmetrically shaped objects between a first orientation, wherein the reflective sides of the plurality of asymmetrically shaped objects face a first direction, and a second orientation, wherein the reflective sides of the plurality of asymmetrically shaped objects face a second direction, substantially opposite the first direction.

2. The reversible thermal rectifier of claim 1, wherein the refractive side is substantially opposite the reflective side.

3. The reversible thermal rectifier of claim 1, wherein each of the plurality of asymmetrically shaped objects are formed from a magnetic material.

4. The reversible thermal rectifier of claim 1, wherein each of the plurality of asymmetrically shaped objects comprise a coating comprising iron.

5. The reversible thermal rectifier of claim 4, wherein each of the plurality of asymmetrically shaped objects comprise a polymeric core.

6. A reversible thermal rectifier for selectively controlling a direction of heat flow, the reversible thermal rectifier comprising:
    a plurality of asymmetrically shaped objects distributed in a fluid medium, each of the plurality of asymmetrically shaped objects comprising a refractive side and a reflective side, wherein heat flows past the plurality of asymmetrically shaped objects when approaching from the refractive side, and heat is reflected from the plurality of asymmetrically shaped objects when approaching from the reflective side; and
    a bidirectional field actuator system that selectively orients the plurality of asymmetrically shaped objects between a first orientation, wherein the reflective sides of the plurality of asymmetrically shaped objects face a first direction, and a second orientation, wherein the reflective sides of the plurality of asymmetrically shaped objects face a second direction, substantially opposite the first direction, and wherein
    the bidirectional field actuator system comprises a first field actuator disposed on a first side of the fluid medium and a second field actuator disposed on a second side of the fluid medium, substantially opposite the first side of the fluid medium, wherein the first field actuator and the second field actuator cooperate to selectively orient the plurality of asymmetrically shaped objects by controlling a field direction of an applied field.

7. The reversible thermal rectifier of claim 6, wherein the first field actuator and the second field actuator comprise electromagnet actuators.

8. The reversible thermal rectifier of claim 6, wherein the first field actuator and the second field actuator comprise electrostatic actuators.

9. A temperature control system comprising a reversible thermal rectifier and a temperature monitoring and heat flow control system, wherein:
    the reversible thermal rectifier comprises:
        a plurality of asymmetrically shaped objects distributed in a fluid medium, each of the plurality of asymmetrically shaped objects comprising a refractive side and a reflective side, wherein heat flows past the plurality of asymmetrically shaped objects when approaching from the refractive side, and heat is reflected from the plurality of asymmetrically shaped objects when approaching from the reflective side; and
        a bidirectional field actuator system that applies a field to the plurality of asymmetrically shaped objects to selectively orient the plurality of asymmetrically shaped objects between a first orientation, wherein the reflective sides of the plurality of asymmetrically shaped objects face a first direction, and a second orientation, wherein the reflective sides of the plurality of asymmetrically shaped objects face a second direction, substantially opposite the first direction; and the temperature monitoring and heat flow control system is communicatively coupled to the reversible thermal rectifier and comprises:

an exterior temperature sensor that measures an exterior temperature, the exterior temperature sensor communicatively coupled to a controller;

an interior temperature sensor that measures an interior temperature, the interior temperature sensor communicatively coupled to the controller, wherein, the controller controls the orientation of the plurality of asymmetrically shaped objects based on the exterior temperature, the interior temperature, or both the exterior temperature and the interior temperature.

10. The temperature control system of claim 9, wherein the controller orients the plurality of asymmetrically shaped objects in the first orientation when the exterior temperature is greater than the interior temperature.

11. The temperature control system of claim 9, wherein the controller orients the plurality of asymmetrically shaped objects in the first orientation when the interior temperature exceeds a threshold temperature.

12. The temperature control system of claim 9, wherein the plurality of asymmetrically shaped objects comprise a magnetic material.

13. The temperature control system of claim 12, wherein the bidirectional field actuator system comprises a first electromagnet disposed on a first side of the fluid medium and a second electromagnet disposed on a second side of the fluid medium, substantially opposite the first side of the fluid medium, wherein the first electromagnet and the second electromagnet cooperate to selectively orient the plurality of asymmetrically shaped objects by controlling a magnetic field direction of a magnetic field disposed there between.

14. The temperature control system of claim 9 wherein the reversible thermal rectifier is disposed within a housing.

15. A vehicle with a temperature control system comprising a reversible thermal rectifier and a temperature monitoring and heat flow control system, wherein:

the reversible thermal rectifier is disposed between an interior of the vehicle and an exterior surface of the vehicle and comprises:

a plurality of asymmetrically shaped objects distributed in a fluid medium, each of the plurality of asymmetrically shaped objects comprising a refractive side and a reflective side, wherein heat flows past the plurality of asymmetrically shaped objects when approaching from the refractive side, and heat is reflected from the plurality of asymmetrically shaped objects when approaching from the reflective side; and a bidirectional field actuator system that applies a field to the plurality of asymmetrically shaped objects to selectively orient the plurality of asymmetrically shaped objects between a first orientation, wherein the reflective sides of the plurality of asymmetrically shaped objects face a first direction, and a second orientation, wherein the reflective sides of the plurality of asymmetrically shaped objects face a second direction, substantially opposite the first direction; and the temperature monitoring and heat flow control system comprises:

an exterior temperature sensor to measure an exterior temperature, the exterior temperature sensor communicatively coupled to a controller;

an interior temperature sensor to measure an interior temperature, the interior temperature sensor communicatively coupled to the controller; and wherein, the controller controls whether the plurality of asymmetrically shaped objects are in the first orientation or in the second orientation based on the exterior temperature, the interior temperature or both the exterior temperature and the interior temperature.

16. The vehicle of claim 15, wherein the reversible thermal rectifier is disposed between a roof of the vehicle and a passenger compartment of the temperature controlled vehicle.

17. The vehicle of claim 15, wherein the reversible thermal rectifier is disposed between a hood of the vehicle and an engine compartment of the vehicle.

18. The vehicle of claim 17, wherein the interior temperature is an engine temperature.

19. The temperature control system of claim 15, wherein the controller orients the plurality of asymmetrically shaped objects in the first orientation when the exterior temperature is greater than the interior temperature.

20. The reversible thermal rectifier of claim 6, wherein the first field actuator and the second field actuator are communicatively coupled to a controller that controls the field direction based on a first temperature external the first side and a second temperature external the second side.

21. A temperature control system comprising a reversible thermal rectifier and a temperature monitoring and heat flow control system, wherein:

the reversible thermal rectifier comprises:

a plurality of asymmetrically shaped objects distributed in a fluid medium, each of the plurality of asymmetrically shaped objects comprising a refractive side and a reflective side, wherein heat flows past the plurality of asymmetrically shaped objects when approaching from the refractive side, and heat is reflected from the plurality of asymmetrically shaped objects when approaching from the reflective side, and wherein the plurality of asymmetrically shaped objects comprise a magnetic material; and a bidirectional field actuator system that selectively orients the plurality of asymmetrically shaped objects between a first orientation, wherein the reflective sides of the plurality of asymmetrically shaped objects face a first direction, and a second orientation, wherein the reflective sides of the plurality of asymmetrically shaped objects face a second direction, substantially opposite the first direction, and wherein, the bidirectional field actuator system comprises a first electromagnet disposed on a first side of the fluid medium and a second electromagnet disposed on a second side of the fluid medium, substantially opposite the first side of the fluid medium, wherein the first electromagnet and the second electromagnet cooperate to selectively orient the plurality of asymmetrically shaped objects by controlling a magnetic field direction of a magnetic field disposed there between; and the temperature monitoring and heat flow control system is communicatively coupled to the reversible thermal rectifier and comprises:

an exterior temperature sensor that measures an exterior temperature, the exterior temperature sensor communicatively coupled to a controller;

an interior temperature sensor that measures an interior temperature, the interior temperature sensor communicatively coupled to the controller, wherein, the controller controls the orientation of the plurality of asymmetrically shaped objects based on the exterior temperature, the interior temperature, or both the exterior temperature and the interior temperature.

22. The reversible thermal rectifier of claim 1, wherein the field is a magnetic field.

23. The reversible thermal rectifier of claim 1, wherein the field is an electromagnetic field.

24. The reversible thermal rectifier of claim 1, wherein the field is an electrostatic field.

25. The temperature control system of claim 9, wherein the field is a magnetic field.

26. The temperature control system of claim 9, wherein the field is an electromagnetic field.

27. The temperature control system of claim 9, wherein the field is an electrostatic field.

28. The vehicle of claim 15, wherein the field is a magnetic field.

29. The vehicle of claim 15, wherein the field is an electromagnetic field.

30. The vehicle of claim 15, wherein the field is an electrostatic field.

* * * * *